Mar. 20, 1923. 1,449,139
J. B. BARTHOLOMEW
MOTOR PROPELLED AGRICULTURAL IMPLEMENT
Filed Aug. 21, 1917 2 sheets-sheet 1
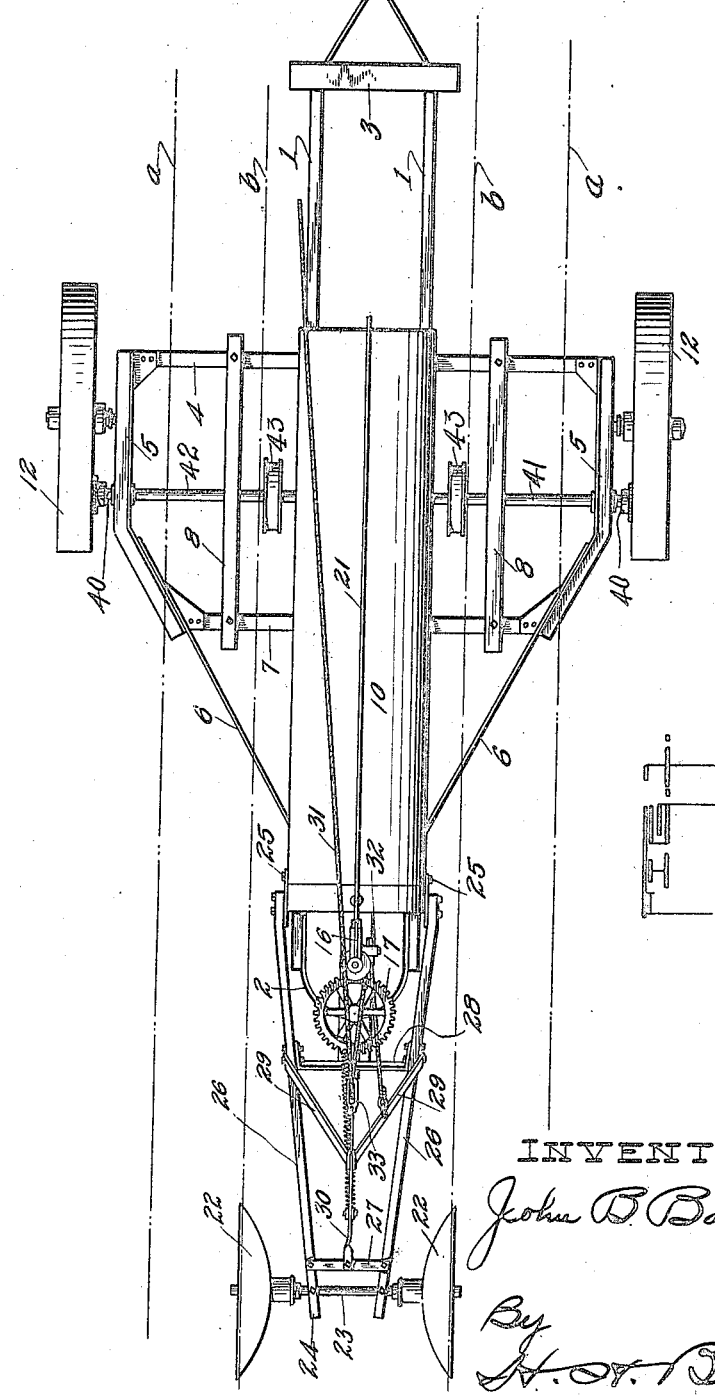
INVENTOR.
John B. Bartholomew
By
H. T. Bush
ATT'Y

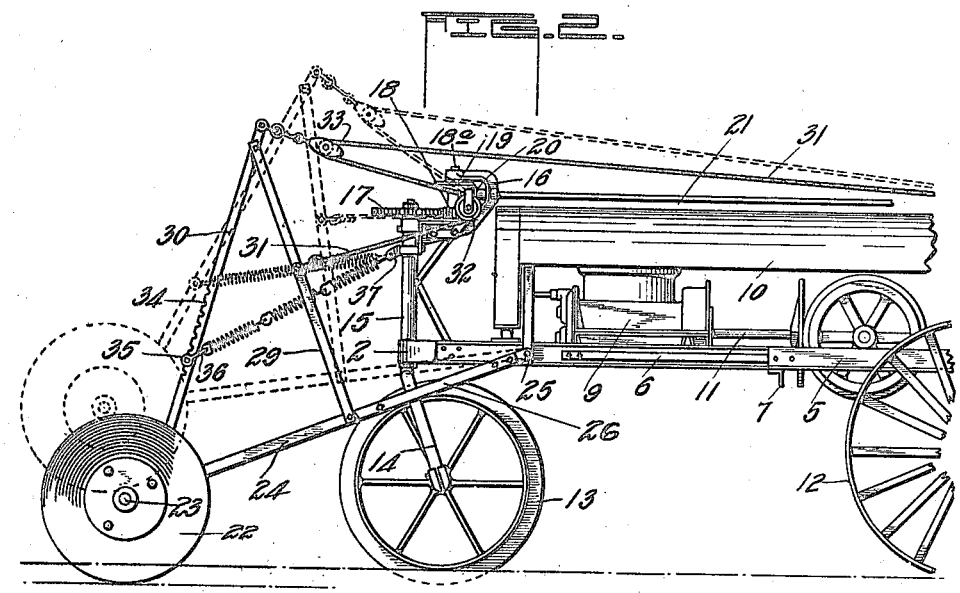
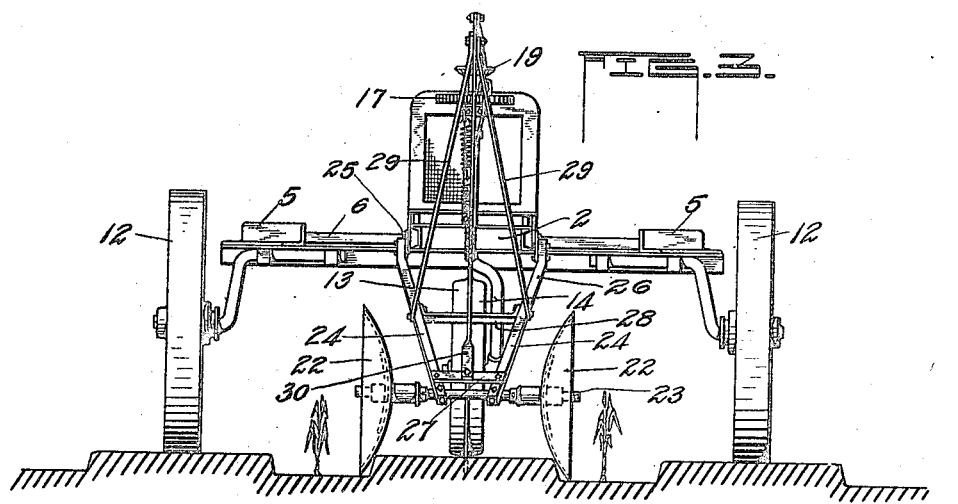

Patented Mar. 20, 1923.

1,449,139

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

MOTOR-PROPELLED AGRICULTURAL IMPLEMENT.

Application filed August 21, 1917. Serial No. 187,497.

*To all whom it may concern:*

Be it known that I, JOHN B. BARTHOLOMEW, a citizen of the United States, a resident of Peoria, in the county of Peoria and State of Illinois, have invented new and useful Improvements in Motor-Propelled Agricultural Implements, of which the following is a specification.

This invention relates to improvements in motor propelled agricultural machines, particularly such as are used under circumstances where for a period they can be permitted to automatically steer themselves, but which at times require to be manually steered, as where the work requires them to be deflected more or less from their lines of travel for optionally determined distances, and which also at times require to be sharply turned as entireties without advancing bodily.

The mechanism which I have devised is particularly and excellently adapted for use in the cultivation of listed plants, that is, plants growing from seeds which are deposited along the bottoms of lists or trenches, sometimes eight or more inches in depth. After such plants have germinated and grown upward to a certain extent, tools are brought to work which are designed to remove weeds and foreign growths along the lines of the lists, and also to partially fill the trenches. Generally this operation is repeated three times in a season. At the first operation about one-third of each trench is filled, and then, after the plants have again emerged and are sufficiently high, a second quantum of soil is cut from the trench walls and thrown across the bottom, and at the third operation the trench is practically filled and the field tract is again leveled. The tools that have been used for this purpose have been provided with convex guide disks or rollers, arranged in pairs, for the purpose of securing a steering action in respect to the tools or to the implement as an entirety. And during the first and the second operations such steering devices act generally satisfactorily. But as the bottoms of the lists or trenches are brought nearly to the land surface the efficiency of the disks or rollers as steering or aligning devices is much reduced, and at places along the rows where the soil is approximately level they frequently become entirely inefficient.

One of the objects of the present invention is to provide a tractor for such work which at one time can be relied on for steering itself, and which at another time can be under perfect alining control by the operator while the implement is moving along with its tools close to a row of plants.

Again, with machines for this and similar purposes provision must be made for returning or reversing them at the ends of rows of plants, so that they can be brought back across the field and work upon the next adjacent rows. The fields are surrounded by fences, or a tract with rows of plants of one sort will be adjacent to another tract, a few feet distant, wherein are growing plants of some other sort. And in order to bring the machine to the ends of the rows and yet avoid striking a fence, or running over the land beyond the rows, it is necessary to provide for sharply turning the machine into reverse position without having it move bodily forward.

And in a listed field it is further necessary that one of the traction wheels should be held stationary, bodily, and serve as a pivot around which the apparatus, as an entirety, can turn, so that the stationary wheel, when reversed, will be in position to come back on the same ridge.

And the mechanism embodying my present improvements can be so turned at the end of a row.

In the accompanying drawings:

Fig. 1 is a plan view of a preferred form of motor propelled machine with my improvements applied thereto;

Fig. 2 is a side elevation of the forward end of the machine, the steering wheels shown elevated in dotted lines, and Fig. 3 is a front elevation of the machine.

Like characters of reference denote corresponding parts throughout the figures.

The machine proper disclosed in the accompanying drawings is substantially that machine described and claimed in my application for Letters Patent for an improved motor cultivator filed on or about the 14 day of March 1917, bearing Serial Number 154,820 and while cultivating instrumentalities are not shown, reference may be had to my application for Letters Patent for an improved motor propelled lister cultivator filed on or about the 3 day of July 1917, bearing Serial Number 178,446 for a disclosure of a preferred form of cultivating mechanism. However, no claim is made in this application to the specific form of motor propelled machine or lister cultivator.

The frame of the motor propelled machine includes preferably the parallel spaced beams 1, 1 connected at their forward ends by the curved strap 2, and at their rear ends by the cross-bar 3; also, the triangular shaped frame, including the parts 4, 5, 5, 6, 6, 7 and 8, 8.

The motor is designated 9, being preferably a gasoline engine of any suitable construction, and mounted on the beams 1, 1 in any suitable manner, and housed within the housing or hood 10. The driving shaft 11 of the engine is adapted by suitable means, not shown, to impart power to the main traction wheels 12. These wheels 12 are mounted on the outwardly turned spindle parts of a crank axle system. They are driven by pinions at 40, respectively carried by the two shaft sections 41, 42, each of which at its inner end is secured to a brake drum 43. Between these drums there is an engine-driven two-part compensating gear of which the parts are respectively connected with the drums 43. By means of the manual devices for controlling the drums the traction wheels 12 can be utilized as steering devices. The details of these parts, conventionally indicated in the present drawings, are fully shown and described in the foresaid application 154820.

13 designates a single centrally disposed castering steering wheel, and said wheel is preferably loosely journaled on the horizontal portion of a vertically disposed shaft 14 journaled in an upstanding tubular sleeve 15, having secured thereto at its upper end a bracket 16. On the upper end of said shaft 14 is a gear wheel 17, and meshing therewith is a pinion 18 carried on one end of a short shaft 18ª. On the opposite end of said shaft 18ª is carried a bevel pinion 19 meshing with a bevel pinion 20 on the forward end of a longitudinally disposed steering shaft 21. The opposite end of this shaft is located within reach of the operator and has a hand wheel, not shown, to permit him to turn the wheel 13 whenever desired. The manually controlled steering devices just referred to are employed by the driver at places where the surface parts of the land are too nearly level to justify relying upon steering devices which depend upon lateral engagement with trench walls or the like, such as are described below.

In Fig. 1, the dotted lines $a$, $b$, $a$, $b$, designate respectively, the outside and inside side walls of furrows made by a lister, it being understood that the construction of the machine is such that the two driving or traction wheels will straddle two rows of corn, etc., and that the single steering wheel is adapted to travel in between the two rows of corn, etc. In Fig. 3, a cross-section of the two furrows is shown.

I will now describe the steering wheels which are adapted to travel in advance of the machine and in the furrows made by the lister, which have for their object, to relieve the operator of the necessity of constantly watching the steering wheel 13 of the machine, so as to keep the cultivating instrumentalities in the furrows. These wheels, of which there are a pair, are designated 22, and are preferably concavo-convex discs. Said discs are journaled on the opposite ends of a shaft 23 carried on the forward end of a detachable frame 24, having a pivotal connection by bolt pins 25 with the forward ends of the beams 1 and normally extending forwardly and downwardly therefrom. This frame preferably comprises the members 26 separated by transverse brace members 27 and 28; the upstanding members 29 which are connected at their lower ends to the members 26 and converging meet and are secured at their upper ends to the upper end of a member 30 which is secured at its lower end to the brace member 27.

To one of the members 29 of the frame 24 is secured one end of a rope 31 and said rope passes over an idler pulley 32 suspended from the bracket 16, and over an idler pulley 33 connected with the upper end of the member 30 of said frame 24, and extending rearwardly of the machine terminates at a point within easy reach of the operator, who, upon drawing said rope 31 rearwardly may raise the frame 24 and discs 22 to the inoperative position shown in dotted lines in Fig. 2.

The discs 22 are preferably arranged in spaced relation with their convex surfaces adapted to roll against the inner side walls of adjacent furrows made by the lister, so that as the machine travels over the ground, the pressure of the side walls of the furrows on the discs 22 will guide the forward end of the machine and insure the cultivating instrumentalities following in the furrows. When the operator wishes to turn the machine at the end of the field, or for any other reason wishes to place the discs 22 in an inoperative position, he may do so by drawing back on the rope 31.

The member 20 is provided with a plurality of notches or seats 34 in any one of which may be seated the crossed member 35 of a loop 36 and connected with said loop is a coil spring, the opposite end of which is connected with a member 37 attached to the upstanding tubular sleeve 15. The function of this spring is to yieldingly retard the movement of the frame 24 as it is lowered, and thus prevent the sudden dropping of the discs into the ground.

The steering element (the disks, frame bars 24, 29, 30, etc.) of the apparatus just described constitutes an attachment which can be readily secured to or taken from the tractor as desired. After releasing the spring from the bracket 15, removing the rope 31 from the pulley guide 32 and withdrawing the pivot bolts at 25, this front steering element can be separated, and a complete tractor vehicle remains.

It will be seen that, as above noted, I provide agricultural implements of the sort illustrated, for example, lister cultivators, with a triple steering mechanism, one part designed for steering automatically; another for steering manually when the operator desires to have the machine gradually deflected from a line; and the third being a mechanism by which he can turn sharply to the left or to the right without advancing bodily at all.

When he desires the machine to automatically direct itself, that is, when the disks 22 are running in lists or trenches, he allows the steering rod 21 and the parts connected thereto to remain free and without manual control, and also releases the friction drums at 43 from band engagement; the disks 22 at such time by engaging with the vertical parts of the list or trench walls, directing the tractor as an entirety. When an area is reached where the disks are not available, they are elevated by the mechanism described, and the driver by means of the hand shaft 21 holds the castering steering wheel 13 rigid in position to guide the front end of the tractor in such way as to regulate the line of travel of the tools.

When he reaches the end of a row it becomes necessary to turn the entire apparatus far enough to have it reversed in its direction. If the ends of the rows are at a line near a fence, or near an adjacent tract which should not be run over by wheels, it becomes necessary to at once sharply turn on one of the large ground wheels as a pivot, and by so turning it brings the side of the tractor, which has the rotating traction wheel on a curved line, approximating a circle, around the non-rotating traction wheel. And after he has turned a half circle, he is ready to return along the next two adjacent rows of plants. While making a sharp turn of this sort the disks are held in their elevated position, and the caster wheel 13 is free of control from the hand shaft so that the wheel automatically swings to an angle approximating right angles to the longitudinal lines of the tractor. The parts of the mechanism are so related that the traction wheels run on alternate ridges. The steering disks are in longitudinal vertical planes between those of the traction wheels and equi-distant from the central longitudinal plane, which includes the axis of the castering wheel. One disk runs in a list or trench, and the other in the next adjacent list, one on each side of the ridge, along the top of which the castering wheel travels, and both lists being between the ridges on which the traction wheels travel.

What I claim is:

1. In a power propelled agricultural implement adapted either to be self-steering along predetermined lines or to be manually steered along curved paths, the combination of the main frame, a tractor engine thereon, traction ground wheels driven by the engine, a centrally arranged frame-supporting castering wheel at the front end of the frame adapted to be freed at option from manual control and to then turn bodily idly, means for manually controlling and holding said wheel to steer the frame, two freely rotating steering disks positioned in front of the said castering wheel, and in longitudinal vertical planes substantially equi-distant from the plane of the vertical axis of the castering wheel, and the manually controlled vertically swinging frame pivoted to the main frame, and carrying said disks at its front end and holding them laterally rigid in relation to the main frame.

2. In a power propelled agricultural implement adapted either to be self-steering along predetermined lines or to be manually steered along curved paths, the combination of the main frame, a tractor engine thereon, traction ground wheels driven by the engine, a centrally arranged frame supporting caster wheel at the front end of the frame adapted to be freed at option from manual control and to turn bodily idly and arranged to travel along the top of a ridge in a listed field, means for manually controlling and holding said wheel to steer the frame, two freely rotating disks positioned in front of the said castering wheel and arranged to have one disk travel in the list or trench on one side of the castering wheel and the other to travel in the next adjacent list on the other side of the castering wheel, and a manually controlled vertically swinging frame carrying the said disks at its front end, and holding them laterally rigid in relation to the frame.

3. In a power propelled agricultural implement for cultivating plants in lists or trenches, the combination of a main frame, a tractor engine thereon, power driven traction wheels arranged to travel along the tops of alternate ridges, two freely rolling steering disks arranged to have one travel in a list or trench and the other to travel in the next adjacent list, both lists being between the said ridges on which the traction wheels travel, the castering wheel supporting the front end of the frame and positioned to travel on the ridge in the central longitudinal vertical planes of the machine, a relatively elongated vertically swinging frame secured to and extending forward from the front end of said main frame, and carrying the said disks at its front end, and manual means for moving the said swinging frame and the disks vertically to and from operative position.

4. In a power propelled agricultural implement for cultivating plants in lists or trenches, the combination of a main frame, a tractor engine thereon, power-driven traction wheels arranged to travel along the tops of alternate ridges, a castering wheel arranged to support the front end of said frame and to travel on the ridge intermediate of those on which the traction wheels travel and adapted to be freed at option from manual control and to turn bodily idly, means for manually controlling and holding said wheel to steer said frame, and two vertically adjustable freely rolling steering disks each in a vertical longitudinal plane between that of the vertical axis of the castering wheel and that of a traction wheel, one of said disks being arranged to travel in a list and the other to travel in the next adjacent list, both lists being between the ridges on which the traction wheels travel.

5. In a power-propelled agricultural implement for cultivating plants in lists or trenches, the combination of a main frame, a tractor engine thereon, power driven traction wheels arranged to travel along the tops of alternate ridges, two freely rolling discs arranged to have one travel in a list or trench and the other to travel in the next adjacent list, both lists being between the said ridges on which the traction wheels travel, said discs being supported by and positioned in advance of the engine frame and movable vertically to and from their working position, and means for retarding one of said traction wheels and causing said frame and the discs to bodily rotate around the said retarded wheel.

In witness whereof, I have hereunto affixed my hand this 15th day of August 1917.

JOHN B. BARTHOLOMEW.